(12) United States Patent
Dhanadevan et al.

(10) Patent No.: US 11,599,271 B2
(45) Date of Patent: Mar. 7, 2023

(54) CONTROLLING I/O Q-CONNECTIONS IN NVME DEVICES

(71) Applicant: Hewlett Packard Enterprise Development LP, Houston, TX (US)

(72) Inventors: Komateswar Dhanadevan, Bangalore Karnataka (IN); Shyamsundar Narasimhan, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/304,868

(22) Filed: Jun. 28, 2021

(65) Prior Publication Data

US 2022/0261158 A1 Aug. 18, 2022

(30) Foreign Application Priority Data

Feb. 12, 2021 (IN) .............................. 202141006104

(51) Int. Cl.
*G06F 3/06* (2006.01)
(52) U.S. Cl.
CPC ............ *G06F 3/0613* (2013.01); *G06F 3/064* (2013.01); *G06F 3/0659* (2013.01); *G06F 3/0679* (2013.01)
(58) Field of Classification Search
None
See application file for complete search history.

(56) References Cited

U.S. PATENT DOCUMENTS

| 10,019,181 B2 | 7/2018 | Singh et al. |
| 2003/0163660 A1* | 8/2003 | Lam .................. G06F 5/065 711/170 |
| 2005/0021879 A1* | 1/2005 | Douglas .............. G06F 13/102 710/5 |

(Continued)

FOREIGN PATENT DOCUMENTS

WO WO-2018049899 3/2018

OTHER PUBLICATIONS

Kim, H., et al.; "A User-space Storage I/O Framework for NVMe SSDs in Mobile Smart Devices"; Feb. 2017; 8 pages.

(Continued)

*Primary Examiner* — Kevin Verbrugge
(74) *Attorney, Agent, or Firm* — Hewlett Packard Enterprise Patent Department (57) ABSTRACT

Examples include selectively adjusting I/O Q-connections between an NVMe controller and a storage device in an NVMe system. In some examples, a utilization time of a host port in an NVMe controller is determined. In response to determining that the utilization time of the host port is lower than a host port utilization threshold and a number of I/O Q-connections at the storage device is less than an I/O Q-connection threshold for the storage device, a candidate list of storage devices is created, each storage devices included in the candidate list having an average service time greater than or equal to an average service time of a host port associated with the storage device. For each storage device included in the candidate list, processing time and I/O block size of I/O requests at the storage device is determined and a number of I/O Q-connections at the storage device is selectively adjusted based on the processing time and I/O block size of I/O requests at the storage device.

20 Claims, 7 Drawing Sheets

(56) References Cited

U.S. PATENT DOCUMENTS

| | | | |
|---|---|---|---|
| 2007/0043854 A1* | 2/2007 | Shum | H04L 67/1097 |
| | | | 709/224 |
| 2011/0119679 A1 | 5/2011 | Muppirala et al. | |
| 2015/0134857 A1* | 5/2015 | Hahn | G06F 3/061 |
| | | | 710/5 |
| 2019/0384722 A1* | 12/2019 | Basu | G06F 11/3471 |
| 2020/0225988 A1 | 7/2020 | Kuttan et al. | |
| 2020/0387312 A1* | 12/2020 | Yang | G06F 3/061 |

OTHER PUBLICATIONS

NVM Express, Inc., "NVM Express Base Specification," Revision 1.4b, Sep. 21,2020, accessible at nvmexpress.org, <https://nvmexpress.org/wp-content/uploads/NVM-Express-1_4b-2020.09.21-Ratified.pdf>, pp. 1-406.

Jane Millston, "Operational Laws," Sep. 24, 2012, <https://homepages.inf.ed.ac.uk/jeh/biss2013/Note2.pdf>, pp. 1-6.

\* cited by examiner

CONTROLLING I/O Q-CONNECTIONS IN NVME DEVICES

BACKGROUND

Non-volatile memory (NVM) is a type of computer memory that retains its contents across power cycles and is therefore capable of being used as storage. Compared to volatile memory that needs power to retain data, NVM may continue to store data even after computer power is turned off. With respect to NVM, NVM Express (NVMe) is a storage interface specification for accessing NVM.

BRIEF DESCRIPTION OF THE DRAWINGS

The following detailed description references the drawings, wherein.

DETAILED DESCRIPTION

NVMe is a storage interface specification for communication between hosts and storage devices (e.g., Solid State Drives (SSDs) on a PCI Express (PCIe) bus). According to the NVMe specification, a storage device may handle thousands of I/O operations in parallel. In order to provide this benefit to enterprise class data centers, NVMe may be extended over fabrics for increased scalability and shareability. In this regard, NVMe over fabrics (NVMe-oF) is a flexible transport abstraction layer that provides for a consistent definition of NVMe over a wide range of storage networking fabrics such as Ethernet and Fibre Channel. A storage device compatible with the NVMe specification and able to process commands (e.g., read commands, write commands, administrative commands, etc.) consistent with and/or provided according to the NVMe specification is referred to as an "NVMe storage device". Example of an "NVMe storage device" may include solid-state drives (SSDs) compatible with the NVMe specification. An "NVMe storage device" may be referred to herein as an "NVMe storage device" or simply as a "storage device". A host may be a computing device that may access data stored in, and write data to, one or more NVMe storage devices. In an example, the host may be a server providing data services to client(s) based on the data stored at one or more of the NVMe storage devices.

The NVMe specification defines both an interface (e.g., a register-level interface) and a command protocol used to communicate with the NVMe storage devices. In a system utilizing the NVMe specification, one or more NVMe storage devices (e.g., including port(s) of the NVMe storage device(s)) may be configured to communicate with a host. Communication between the host and one or more NVMe storage devices may be implemented by an NVMe controller. The NVMe controller, also referred to as a "head node", may be a storage array controller at a front end that can manage one or more NVMe storage devices, such as SSDs, at a back end. A host may be connected to a host port on the NVMe controller, thereby associating the host port with the host. In an example, the host port may be a physical port acting as an interface between the host and the NVMe controller. The interface between the NVMe controller and the NVMe storage device may be based on several queue pairs (i.e., paired submission and completion queues) shared between the NVMe controller (e.g., including port(s) of the NVMe controller) and the NVMe storage device (e.g., including port(s) of the NVMe storage device). The queue pairs may be located either in the host memory or in the memory provided by the NVMe storage device. In an example, the NVMe specification allows up to 64K individual queue pairs per NVMe storage device, and each queue pair can have up to 64K entries. Once the queue pairs are configured, these queue pairs may be used for almost all communication between the NVMe controller and an NVMe storage device using the command protocol. Every new entry may be submitted to an NVMe storage device using a submission command via a submission queue. When the submission command is processed, an entry (that has been previously associated with the submission queue from which the command was retrieved) may be put on a completion queue using a completion command, and an interrupt may be generated. There may be separate queue pairs for administration operations (e.g., creating and deleting queues or updating firmware on the device) and for I/O operations (e.g., Read and Write). Separate queue pairs may avoid excessive delay of I/O operations due to long-running administration operations. Each queue pair for I/O operations between the NVMe controller and an NVMe storage device may be referred to as an "I/O Q-connection" at the NVMe storage device.

Generally, NVMe storage devices can process I/O operations at a faster rate as compared to the NVMe controller. However, since a single NVMe controller may manage multiple NVMe storage devices at the back-end, the processing load at the NVMe controller may increase manifold with increase in processing load in one or more of the multiple NVMe storage devices. Thus, the NVMe controller may not be able to process commands to and from the multiple NVMe storage devices at an optimal rate and consequently Input Output Operations per Second (IOPS) between the NVMe controller at the front end and the NVMe storage devices at the back end may be reduced thereby adversely affecting performance. Therefore, the NVMe controller may become a bottleneck in achieving high IOPS between the NVMe controller and the NVMe storage devices. Further, in some cases, the number of I/O Q-connections between the NVMe controller and NVMe storage devices may not be enough to process incoming I/O load from the hosts which may lead to choking of I/O operations at the NVMe storage devices. Choking of I/O operations at the NVMe storage devices may lead to an increase in latency at the NVMe storage devices and timeouts in application(s) running in the hosts.

Examples described herein provide techniques to dynamically scale up or scale down I/O Q-connections between the NVMe controller and the NVMe storage devices based on the I/O workload, consequently improving IOPS for storage applications. The techniques may determine a utilization time of a host port in the NVMe controller. The host port may be associated with a host and may communicate with an NVMe storage device. The utilization time of the host port is indicative of a time period for which the host port is occupied with processing of I/O operations. In response to determining that the utilization time of the host port is below a host port utilization threshold and a number of I/O Q-connections at the NVMe storage device is less than an I/O Q-connection threshold for the NVMe storage device, the NVMe controller may create a candidate list of NVMe storage devices. The I/O Q-connection threshold is indicative of the maximum number of I/O Q-connections that can be simultaneously supported by an NVMe storage device for servicing I/O requests. The candidate list may include NVMe storage devices for which selective adjustment of I/O Q-connections could be considered. Each NVMe storage device included in the candidate list has an average service time greater than or equal to an average service time of a host port associated with the NVMe storage device. The host port utilization threshold is indicative of a maximum amount of the time that the host port may be occupied with processing of I/O operations. The average service time of an NVMe storage device refers to the average time taken by an NVMe storage device to process I/O operations (e.g. read or write). A host or NVMe controller may send I/O requests including commands/instructions for executing I/O operations (e.g. read or write) at NVMe storage device(s). The average service time of a host port of the NVMe controller refers to the average time taken by the host port to process an I/O operation. For each NVMe storage device included in the candidate list, the NVMe controller may determine processing time and I/O block size of I/O requests at the NVMe storage device and selectively adjust, based on the processing time and I/O block size of I/O requests, the number of I/O Q-connections at the NVMe storage device. In this manner, the number of I/O Q-connections between the NVMe controller and the NVMe storage devices may be increased or decreased, based on the workload, consequently achieving higher IOPS and improving performance. Increasing or decreasing the number of I/O Q-connections based on the workload may facilitate reducing the latency in processing I/O operations from the hosts via the storage devices and thereby reduce timeouts in applications running in the hosts.

Figure 1:
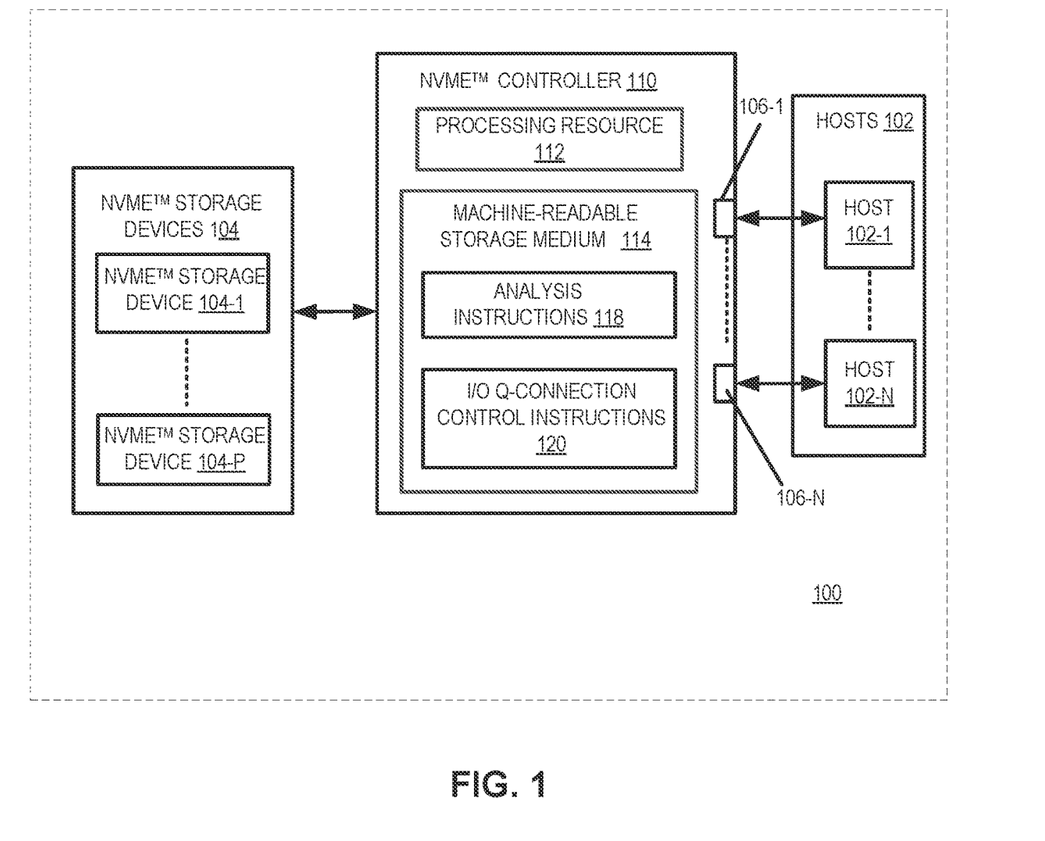
FIG. 1 is a block diagram of a system including a number of hosts and NVMe storage devices, connected to an NVMe controller, in accordance with an example.

FIG. 1 illustrates an example system 100 including an NVMe controller 110 (hereinafter also referred to as "controller 110") that may facilitate connecting hosts 102 to communicate with NVMe storage devices 104 (hereinafter also referred to as "storage devices 104"). In an example, a storage array may include the storage devices 104 and may include controller 110 as the storage array controller of the storage array. The system 100 illustrated in FIG. 1 may include a plurality of NVMe storage devices 104 (designated as NVMe storage devices 104-1 through 104-P) and a plurality of hosts 102 (designated as hosts 102-1 through 102-N). Each of the NVMe storage devices 104 may be accessed by a corresponding subset of the hosts 102. For example, a first subset of the hosts 102 can communicate with an NVMe storage device 104-1, a second subset of the hosts 102 can communicate with an NVMe storage device 104-2, and so on. In some examples, a given host of the hosts 102 can communicate with two or more of NVMe storage devices 104 (i.e., the given host may belong to two or more subsets of the hosts).

In an example, the controller 110 may be attached to, be aware of, be part of, be associated with, and/or be otherwise related to a fabric (e.g., NVMe fabrics) to which the hosts 102 and NVMe storage devices 104 are communicatively connected. The controller 110 may include at least one processing resource 112 communicatively coupled to a machine-readable storage medium 114 including at least analysis instructions 118 and I/O Q-connection control instructions 120 that, when executed by the at least one processing resource 112, cause the controller 110 to perform actions described herein in relation to controller 110. In some examples, the instructions of controller 110 may be executed in a switch (e.g., embedded in a container), in a virtual machine (VM), or in an NVMe storage device (e.g., the NVMe storage device 104-1).

The controller 110 may facilitate connecting the hosts 102 to NVMe storage devices 104. The hosts 102 can communicate to the NVMe storage device(s) based on a mapping. For example, in FIG. 1, the mapping may indicate that the hosts designated 102-1, . . . , 102-N can communicate with the NVMe storage devices 104.

The controller 110 includes host ports 106-1, . . . , 106-N, also referred to as host ports 106. Each of the hosts 102 may connect with a host port, form the host ports 106, thereby associating each of the host ports 106 with a particular host. Each of the hosts 102 associated with a host port, from the host ports 106, may be enabled to communicate with an NVMe storage device from a plurality of NVMe storage devices 104.

The controller 110 may include analysis instructions 118 and I/O Q-connection control instructions 120 to perform one or more functionalities of the controller 110 as described herein. In other examples, functionalities described herein in relation to controller 110 may be implemented via any combination of hardware and programming to perform the functionalities described herein in relation to controller 110. The combination of hardware and programming may be implemented in a number of different ways. For example, the programming may include processor executable instructions stored on a non-transitory machine-readable storage medium and the hardware may include at least one processing resource (e.g., at least one processor, CPU, circuitry, etc.) to execute those instructions. In examples described herein, a single computing device (e.g., a storage array) may include machine-readable storage medium storing the instructions (or other programming) and the processing resource (or other hardware) to execute the instructions (or other programming), or the machine-readable storage medium storing instruction (or other programming) may be separate from and accessible by the computing device and the processing resource. In some examples, the hardware and programming may be implemented in circuitry.

In an example, a sampling interval may be configured for the controller 110. The sampling interval is indicative of a time interval at which the controller 110 is to perform one or more functionalities for managing a number of I/O Q-connections between the controller 110 and the NVMe storage devices 104-1 to 104-P. The sampling interval may be predefined based on a user input. The sampling interval may be, for example, 3600 seconds. In an example, the I/O Q-connection control instructions 120 may create a pair of I/O Q-connections between the controller 110 and each NVMe storage device 104-1, . . . , 104-P. One of the pair of I/O Q-connections (i.e., a set of submission and completion queues) may be dedicated for read operations and the other of the pair of I/O Q-connections (another set of submission and completion queues) may be dedicated for write operations.

The analysis instructions 118 may determine a utilization time of each of the plurality of host ports 106-1 to 106-N. Although, in the description hereinafter, the operations/ functionalities are described with reference to the host port 106-1 and storage device 104-1, similar operations/functionalities may also be performed in respect of each of the other host ports 106-2 to 106-N and each of the storage devices 104. The analysis instructions 118 may determine a throughput of the host port 106-1 based on a number of I/O request completions at the host port 106-1 over the sampling interval. The I/O request completions at the host port 106-1 may refer to I/O requests serviced/processed at the host port 106-1 during the sampling interval. In an example, the throughput of the host port 106-1 is a ratio of a number of I/O request completions at the host port 106-1 to the sampling interval.

Further, the analysis instructions 118 may determine an average service time of the host port 106-1. The average service time is indicative of the average time taken for processing an I/O operation (read or write) by the host port 106-1. The average service time of the host port 106-1 may be computed as a ratio of a busy time period of the host port 106-1 and the number of I/O request completions at the host port 106-1 over the sampling interval. The busy time period of the host port 106-1 refers to a time duration for which the host port 106-1 remains unavailable for processing/receiving I/O requests from the hosts 102, such as the host 102-1. The utilization time of the host port 106-1 may be computed as a product of the throughput of the host port 106-1 and the average service time of the host port 106-1. The utilization time of each of the host ports 106-2 to 106-N may also be determined in a similar manner.

The analysis instructions 118 may compare the utilization time of the host port 106-1 with a host port utilization threshold. In an example, the host port utilization threshold may be expressed in terms of percentage of the sampling interval for which the host port 106-1 is utilized, say 98% of the sampling interval. Further, the analysis instructions 118 may also check whether a number of I/O Q-connections at an NVMe storage device (such as storage device 104-1) is less than an I/O Q-connection threshold for the storage device 104-1. In an example, the analysis instructions 118 may receive, from the storage device 104-1, information including a quantity of the I/O Q-connections (i.e., a number of I/O Q-connections) existing at the storage device 104-1, at a point in time. In some examples, the storage device 104-1 may send a registration command, to the controller 110, to register the number of existing I/O Q-connections at the storage device 104-1 with the controller 110. The registration command may comprise information including the number of existing I/O Q-connections and device parameter(s) of the storage device 104-1. The analysis instructions 118 may obtain the information including the number of existing I/O Q-connections from the registration command. The device parameter(s) of the storage device 104-1 may include information related to the I/O Q-connection threshold for the storage device 104-1. The I/O Q-connection threshold indicates the maximum number of I/O Q-connections that can be simultaneously supported by the storage device 104-1 for servicing I/O requests. In an example, the I/O Q-connection threshold for the storage device 104-1 may depend on device driver configuration of the storage device 104-1. The analysis instructions 118 may obtain the information including the I/O Q-connection threshold from the device parameter(s) included in the registration command. The analysis instructions 118 may compare the number of existing I/O Q-connections at the storage device 104-1 with the I/O Q-connection threshold.

In response to determining that the utilization time of the host port 106-1 is lower than the host port utilization threshold and the number of I/O Q-connections at the storage device 104-1 is less than the I/O Q-connection threshold for the storage device 104-1, the analysis instructions 118 may create a candidate list of storage devices. The candidate list may include NVMe storage devices for which selective adjustment of I/O Q-connections could be considered. The storage device 104-1 may be included in the candidate list, if an average service time of the storage device 104-1 being greater than or equal to an average service time of the host port 106-1. If the average service time of the storage device 104-1 is less than the average service time of the host port 106-1, the storage device 104-1 is not added to the candidate list and other storage devices 104 may be considered for addition to the candidate list. Thus, each NVMe storage device included in the candidate list has an average service time greater than or equal to an average service time of a host port associated with the NVMe storage device. A host port associated with an NVMe storage device may refer to a host port which can access the resources of the NVMe storage device in an NVMe system, such as the system 100.

Although, the techniques hereinafter are described with reference to controlling I/O Q-connections between the controller 110 and the storage device 104-1, similar techniques may be employed to control I/O Q-connections between the controller 110 and each of the storage devices 104. In an example, the analysis instructions 118 may determine a number of I/O request completions at the storage device 104-1 over the sampling interval. The I/O request completions at the storage device 104-1 refers to I/O requests serviced/processed at the storage device 104-1 during the sampling interval. The analysis instructions 118 may also determine a busy time period of the storage device 104-1. The busy time period may indicate a time period for which the storage device 104-1 may remain unavailable to process new I/O requests during the sampling interval. The analysis instructions 118 may determine an average service time of the storage device 104-1 as a ratio of the busy time period of the storage device 104-1 to the number of I/O request completions at the storage device 104-1.

In response to determining that the average service time of the storage device 104-1 is greater than or equal to the average service time of the host port 106-1, the analysis instructions 118 may group the storage device 104-1 within the candidate list. Thus, for each of the storage devices 104-1 to 104-P, if average service time of the storage device, is greater than or equal to the average service time of the host port 106-1, they may be added to the candidate list. In an example, consider that storage devices 104-1 and 104-2 are included in the candidate list.

The analysis instructions 118 may also determine a visit ratio of the storage device 104-1. The visit ratio of the storage device 104-1 is defined as the number of I/O request completions at the storage device 104-1 per unit time of the sampling interval. Further, a throughput of the storage device 104-1 may be determined based on the visit ratio. In an example, the throughput of the storage device 104-1 may be computed as a product of the visit ratio of the storage device 104-1 and the throughput of the host port 106-1. The analysis instructions 118 may determine a service demand for the storage device 104-1 as a product of the visit ratio of the storage device 104-1 and the average service time of the storage device 104-1. Further, the analysis instructions 118 may determine a utilization time of the storage device 104-1 as a product of the throughput of the host port 106-1 and the service demand of the storage device 104-1. Likewise, a utilization time of the storage device 104-2 (included in the candidate list) may also be determined.

In an example, the I/O Q-connection control instructions 120 may determine an average time for processing read requests by the storage device 104-1 in the sampling interval. A read request refers to an I/O request from a host to read data from one of the storage devices. The I/O Q-connection control instructions 120 may check whether there is a change in the average time for processing read requests by the storage device 104-1 over two successive sampling intervals. In an example, the average time for processing a first set of read requests by the storage device 104-1 during a first sampling interval may be compared with the average time for processing a second set of read requests by the storage device 104-1 in a second sampling interval, where the first and second sampling intervals are successive sampling intervals. Based on the comparison, the I/O Q-connection control instructions 120 may determine the change in the average time for processing the read requests. In an example, the change may indicate an increase or decrease in the average time for processing the read requests by the storage device 104-1. Further, the I/O Q-connection control instructions 120 may also check whether the utilization time of the storage device 104-1 is less that a storage utilization threshold, say, 95% of the sampling interval. The storage utilization threshold is indicative of a maximum amount of time for which the storage device 104-1 may be occupied with processing of I/O operations.

In response to determining that there is an increase in the average time for processing read requests by the storage device 104-1 and the storage device 104-1 has a utilization time less than the storage utilization threshold, the I/O Q-connection control instructions 120 may determine whether a number of read requests of small I/O block size received per second during the sampling interval is greater than or equal to a read I/O threshold. In an example, read requests having an I/O block size less than or equal to 4 Kilo Bytes (KB) may be referred to as read requests of small I/O block size. The read I/O threshold may indicate a certain amount, for example, 80%, of the read requests received per second by the storage device 104-1 during the sampling interval. Thus, the I/O Q-connection control instructions 120 may check whether the number of read requests of small I/O block size received per second during the sampling interval is greater than or equal to 80% of the read requests received per second by the storage device 104-1.

In response to determining that the number of read requests of small I/O block size received per second during the sampling interval is greater than or equal to the read I/O threshold, the I/O Q-connection control instructions 120 may add an I/O Q-connection with high priority associated with read requests of small I/O block size. The I/O Q-connection may include a submission queue and a completion queue between the controller 110 and the storage device 104-1. The I/O Q-connection is dedicated to read requests of small I/O block size received at the storage device 104-1. In an example, the added I/O Q-connection may have a priority higher than an I/O Q-connection that is currently servicing the read requests at the storage device 104-1. Thus, the I/O requests serviced through the added I/O ( ) connection may be processed at a higher speed.

In an example, the I/O Q-connection control instructions 120 may determine that the number of read requests of large I/O block size, such as I/O blocks of 512 KB, received per second during the sampling interval is greater than or equal to the read I/O threshold. In response to determining that the number of read requests of large I/O block size received per second during the sampling interval is greater than or equal to the read I/O threshold, the I/O Q-connection control instructions 120 may add an I/O Q-connection with normal priority associated with read requests of large I/O block size. In an example, the added I/O Q-connection may have a priority same as that of an I/O Q-connection that is currently servicing the read requests at the storage device 104-1. The added I/O Q-connection is dedicated to read requests of large I/O block size received by the storage device 104-1.

In response to determining that the average time for processing read requests by the storage device 104-1 has reduced over two successive sampling intervals, or that the storage device 104-1 has the utilization time greater than the storage utilization threshold, the I/O Q-connection control instructions 120 may check whether more than one I/O Q-connection is present between the storage device 104-1 and the controller 110. Further, the I/O Q-connection control instructions 120 may determine whether there is a change in the service demand of the storage device 104-1 over two successive sampling intervals. In an example, the service demand of the storage device 104-1 in a first sampling interval may be compared with the service demand of the storage device 104-1 in a second sampling interval to determine the change in service demand. The first and second sampling intervals may be two successive sampling intervals. Responsive to determining that there is a decrease in the service demand of the storage device 104-1 over two successive sampling intervals and more than one I/O Q-connection is present between the storage device 104-1 and the controller 110, the I/O Q-connection control instructions 120 may delete an I/O Q-connection between the storage device 104-1 and the controller 110.

In an example, the I/O Q-connection control instructions 120 may determine an average time for processing write requests by the storage device 104-1 during the sampling interval. A write request refers to a request from a host to write data onto one of the storage devices 104. The I/O Q-connection control instructions 120 may check whether there is a change in the average time for processing write requests over two successive sampling intervals. In an example, an average time for processing a first set of write requests by the storage device 104-1 in a first sampling interval may be compared with an average time for processing a second set of write requests in a second sampling interval to determine the change in the average time for processing write requests. In an example, the first sampling interval and second sampling interval may be successive sampling intervals. In an example, the change may indicate an increase or decrease in the average time for processing write requests by the storage device 104-1. Further, the I/O Q-connection control instructions 120 also checks whether the utilization time of the storage device 104-1 is less that the storage utilization threshold.

In response to determining that there is an increase in the average time for processing the write requests by the storage device 104-1 and the storage device 104-1 has a utilization time less than the storage utilization threshold, the I/O Q-connection control instructions 120 may determine whether a number of write requests of small I/O block size, such as I/O block size less than or equal to 4 KB, received per second during the sampling interval is greater than or equal to a write I/O threshold. The write I/O threshold may indicate a certain amount, for example, 80%, of the write requests received per second by the storage device 104-1 during the sampling interval. Thus, the I/O Q-connection control instructions 120 may check whether at least 80% of the write requests received per second by the storage device 104-1 during the sampling interval is of small I/O block size.

In response to determining that the number of write requests of small I/O block size received per second during the sampling interval is greater than or equal to the write I/O threshold, the I/O Q-connection control instructions 120 may add an I/O Q-connection associated with write requests. The added I/O Q-connection is dedicated to process write requests at the storage device 104-1. In an example, the I/O Q-connection control instructions 120 may determine that a number of write requests of large I/O block size, such as I/O blocks of 512 KB, received per second during the sampling interval is greater than or equal to the write I/O threshold. In response to determining that the number of write requests received per second during the sampling interval is greater than or equal to the write I/O threshold, the I/O Q-connection control instructions 120 may add a completion queue associated with write requests. The completion queue associated with write requests may refer to a completion queue between the controller 110 and the storage device 104-1 dedicated to processing of write requests at the storage device 104-1. In the manner, as described above, the I/O Q-connection control instructions 120 may selectively adjust the number of I/O Q-connections at the storage device 104-1 based on processing time and I/O block size of I/O requests at the storage device 104-1. Likewise, in a similar manner, the I/O Q-connection control instructions 120 may selectively adjust the number of I/O Q-connections at the storage device 104-2 which is considered to be included in the candidate list. Thus, for each NVMe storage device included in the candidate list, processing time and I/O block size of I/O requests at the NVMe storage device are determined based on which the number of I/O Q-connections at the NVMe storage device is selectively adjusted.

Figure 2:
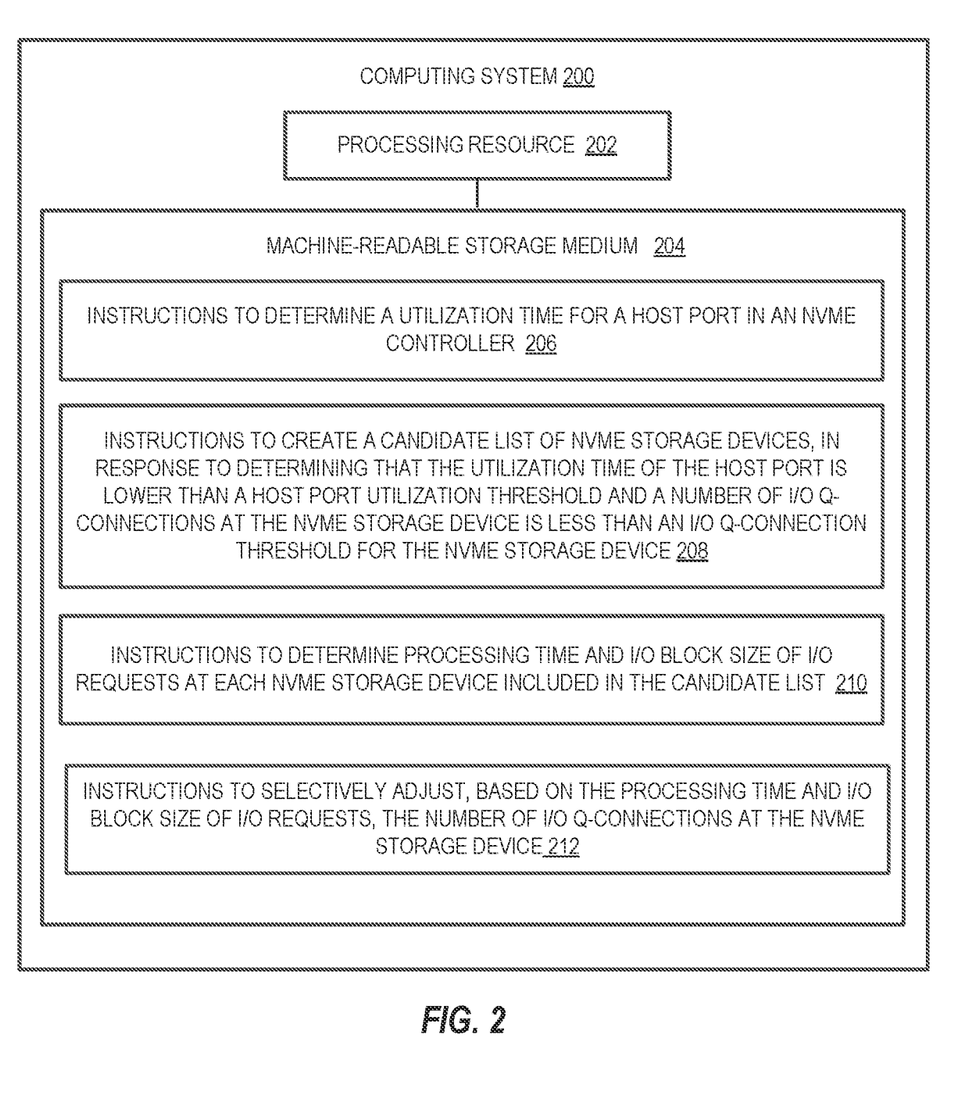
FIG. 2 is a block diagram of a computing system comprising a processing resource and a machine-readable storage medium encoded with example instructions to manage a number of I/O Q-connections between an NVMe controller and a number of NVMe storage devices, in accordance with an example.

FIG. 2 is a block diagram of a computing system 200 including a processing resource 202 and a machine-readable storage medium 204 encoded with example instructions 206, 208, 210, and 212 to control I/O Q-connections between an NVMe controller (such as the NVMe controller 110 of FIG. 1) and a storage device (such as the storage device 104-1 of FIG. 1), in accordance with an example.

In some examples, the machine-readable storage medium 204 may be accessed by the processing resource 202. The processing resource 202 may execute instructions (i.e., programming or software code) stored on the machine-readable storage medium 204. The instructions 206, 208, 210, and 212 of FIG. 2, when executed by the processing resource 202, may implement various aspects of selectively adjusting I/O Q-connections between the NVMe controller and the storage device. In an example, the instructions 206 and 208 may be included within the analysis instructions 118 and the instructions 210 and 212 may be included within the I/O Q-connection control instructions 120 of FIG. 1. In some examples, the computing system 200 may be included in (e.g., as part of) an NVMe controller (e.g., the NVMe controller 110 of FIG. 1). For ease of illustration, FIG. 2 will be described with reference to FIG. 1. In certain examples, the instructions 206-212 may be executed for performing the functionalities of the NVMe controller 110 and one or more methods, such as, the methods 300 and 400 described in FIGS. 3 and 4A-4D. In certain examples, as an alternative or in addition to executing the instructions 206-212, the processing resource 202 may include at least one IC, other control logic, other electronic circuitry, or combinations thereof that include a number of electronic components for performing the functionalities described herein as being performed by the NVMe controller 110.

Instructions 206, when executed by the processing resource 202, may determine a utilization time of the host port 106-1 in the NVMe controller 110. The host port 106-1 is associated with a host 102-1 and is to communicate with an NVMe storage device 104-1.

In response to determining that the utilization time of the host port 106-1 is lower than a host port utilization threshold and a number of I/O Q-connections at the storage device 104-1 is less than the I/O Q-connection threshold for the storage device 104-1, instructions 208 may create a candidate list of NVMe storage devices. Each NVMe storage device (such as the NVMe storage device 104-1) included in the candidate list has an average service time greater than or equal to an average service time of a host port associated with the NVMe storage device (such as the host port 106-1 associated with the NVMe storage device 104-1).

For the NVMe storage device 104-1 included in the candidate list, instructions 210, when executed by the processing resource 202, may determine processing time and I/O block size of I/O requests at the NVMe storage device 104-1 . . . Instructions 212, when executed by the processing resource 202, may selectively adjust, based on the processing time and I/O block size of I/O requests, the number of I/O Q-connections at the NVMe storage device 104-1.

The instructions 206-212 may include various instructions to execute at least a part of the methods described in FIGS. 3-4A-4D (described later). Also, although not shown in FIG. 2, the machine-readable storage medium 204 may also include additional program instructions to perform various other method blocks described in FIGS. 3 and 4A-4D.

FIGS. 3 and 4A-4D depict flowcharts of example methods 300 and 400 for controlling I/O Q-connections between NVMe storage devices (e.g., the NVMe storage devices 104 of FIG. 1) and an NVMe controller (NVMe controller 110 of FIG. 1). For ease of illustration, the execution of example methods 300 and 400 is described in details below with reference to FIG. 1. Although the below description is described with reference to the NVMe controller 110 of FIG. 1, however other applications or devices suitable for the execution of methods 300 and 400 may be utilized. Furthermore, although the below description is described with reference to the NVMe storage device 104-1 of FIG. 1, however the methods 300 and 400 are applicable to other NVMe storage devices. In some examples, the methods 300 and 400 may, individually, be executed for each NVMe storage device present in the system 100. The method steps at various blocks depicted in FIGS. 3 and 4A-4D may be performed by the NVMe controller 110. In some examples, the methods 300 and 400, individually, at each such method blocks may be executed by the computing system 200 via the processing resource 202 that executes the instructions 206-212 stored in the non-transitory machine-readable storage medium 204. Additionally, implementation of methods 300 and 400 is not limited to such examples. Although the flowcharts of FIGS. 3 and 4A-4D, individually, show a specific order of performance of certain functionalities, methods 300 and 400 are not limited to such order. For example, the functionalities shown in succession in the flowcharts may be performed in a different order, may be executed concurrently or with partial concurrence, or a combination thereof.

Figure 3:
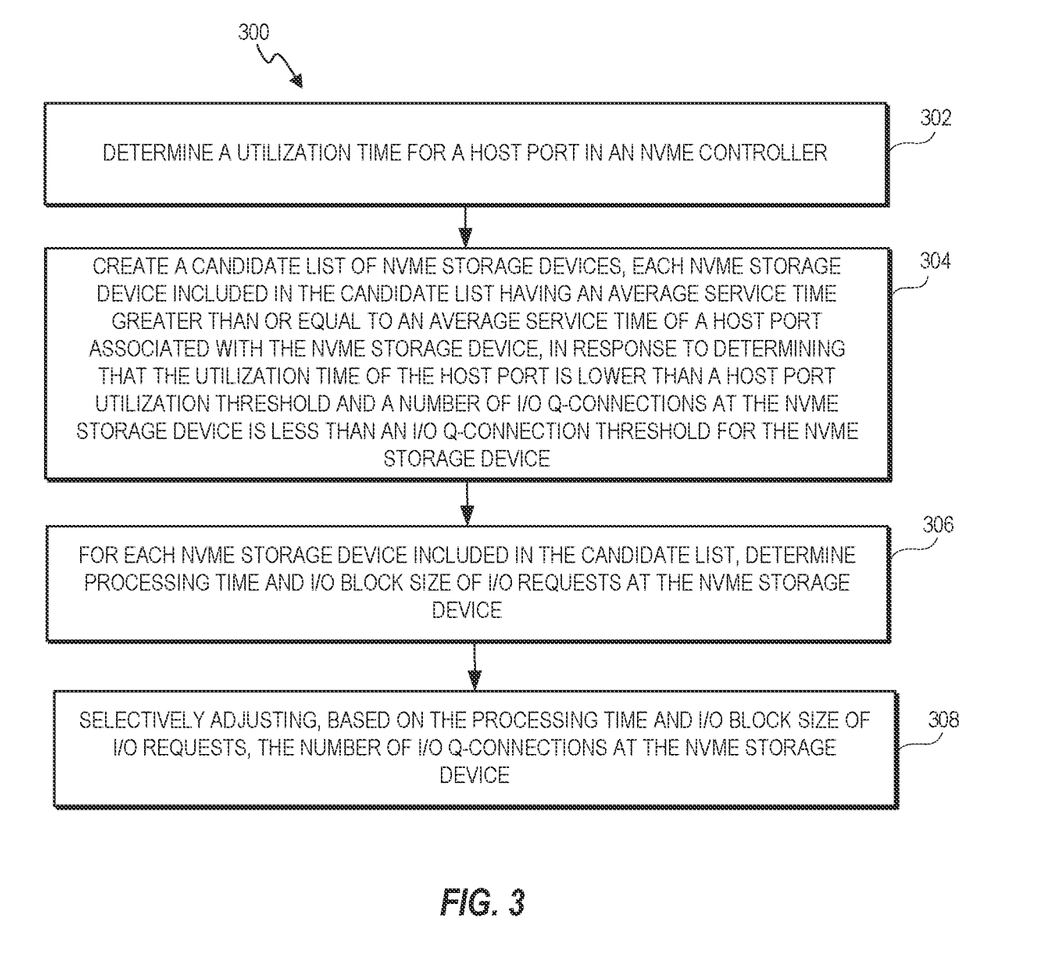
FIG. 3 is a flowchart of a method for managing a number of I/O Q-connections between an NVMe controller and a number of NVMe storage devices, in accordance with an example.

In FIG. 3, at block 302, the method 300 may include determining a utilization time of the host port 106-1 in the NVMe controller 110. The host port 106-1 is associated with a host 102-1 and is to communicate with an NVMe storage device 104-1. In an example, a throughput of the host port 106-1 may be determined based on a number of I/O request completions at the host port 106-1 over the sampling interval. In an example, the throughput of the host port 106-2 is a ratio of a number of I/O request completions at the host port 106-1 to the sampling interval. Further, an average service time of the host port 106-1 may be determined. The average service time is indicative of the average time taken for servicing an I/O request at the host port 106-1. The average service time of the host port 106-1 may be computed as a ratio of a busy time period of the host port 106-1 and the number of I/O request completions at the host port 106-1 over the sampling interval. The busy time period of the host port 106-1 refers to a time duration for which the host port 106-1 remains unavailable for processing/receiving I/O requests from the host 102-1. The utilization time of the host port 106-1 may be computed as a product of the throughput of the host port 106-1 and the average service time of the host port 106-1.

In response to determining that the utilization time of the host port 106-1 is lower than a host port utilization threshold and the number of I/O Q-connections at the storage device 104-1 is less than the I/O Q-connection threshold for the storage device 104-1, at block 304, the method 300 may include creating a candidate list of NVMe storage devices. Each NVMe storage device, such as the NVMe storage device 104-1, included in the candidate list, has an average service time greater than or equal to an average service time of the host port 106-1. The candidate list may include NVMe storage devices for which selective adjustment of I/O Q-connections could be considered.

At block 306, the method 300 may include, for each storage device, such as the storage device 104-1, included in the candidate list, determining a processing time and I/O block size of I/O requests at the storage device 104-1. At block 308, the method 300 may include, for the storage device 104-1 included in the candidate list, selectively adjusting, based on the processing time and I/O block size of I/O requests, the number of I/O Q-connections at the storage device 104-1.

Figure 4A:
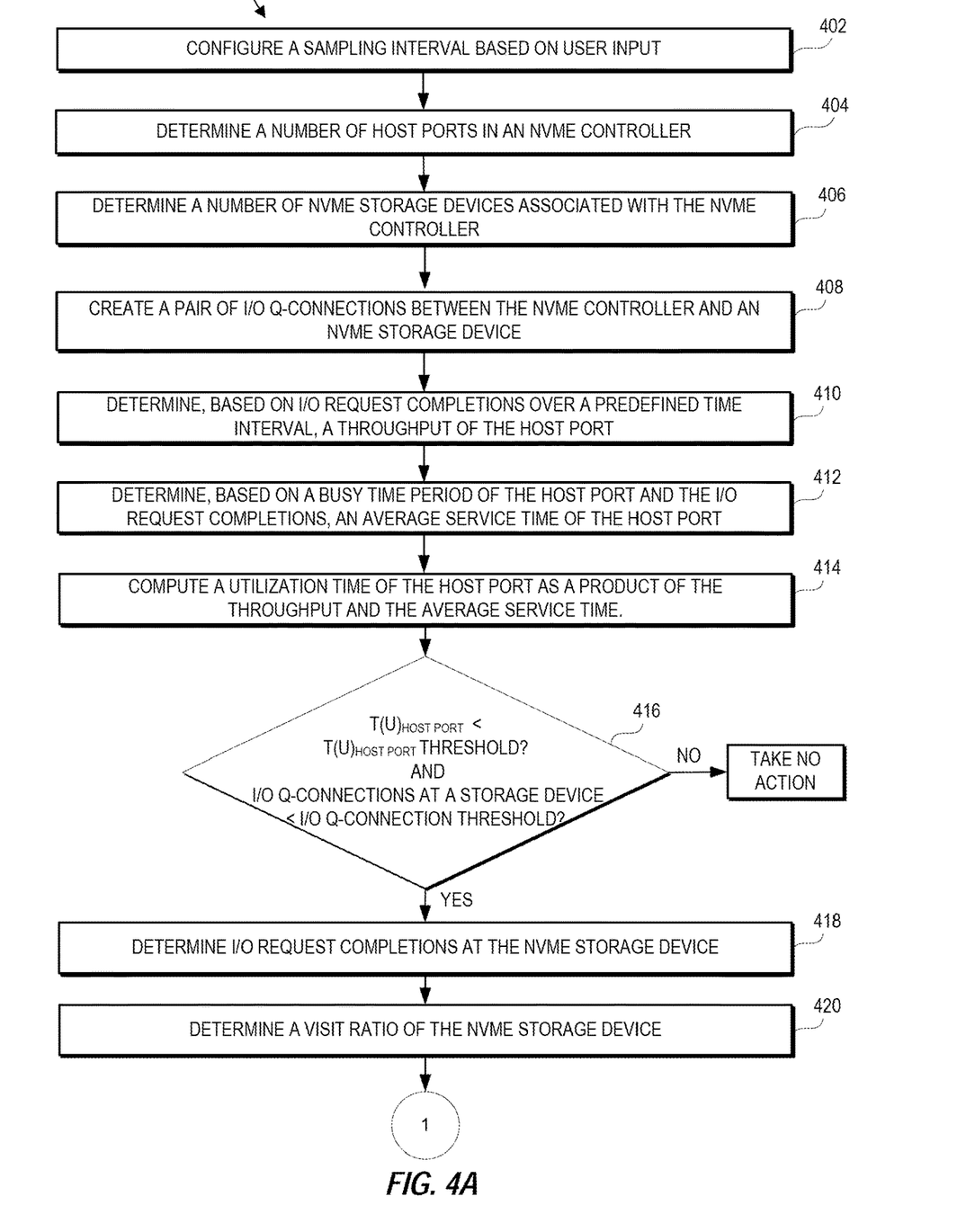
FIGS. 4A-4D depict a flowchart of a method for managing a number of I/O Q-connections between an NVMe controller and a number of NVMe storage devices, in accordance with another example.

Turning now to FIG. 4A, at block 402, the method 400 may include configuring a sampling interval based on a user input. At block 404, the method 400 may include determining a number of host ports 106-1 to 106-N in an NVMe controller 110. At block 406, the method 400 may include determining a number of NVMe storage devices 104-1 to 104-P associated with the NVMe controller 110. In an example, the storage devices 104 may register with the NVMe controller 110 using a registration request and thereby associate with the NVMe controller 110.

At block 408, the method 400 may include creating a pair of I/O Q-connections between the NVMe controller 110 and an NVMe storage device, such as the NVMe storage device 104-1. Each of the pair of I/O Q-connections may include a submission queue for read and write operations and a completion queue. At block 410, the method 400 may include determining, based on I/O request completions over the sampling interval, a throughput of a host port 106-1. In an example, the throughput of the host port 106-2 is a ratio of a number of I/O request completions at the host port 106-1 to the sampling interval.

At block 412, the method 400 may include determining, based on a busy time period of the host port 106-1 and the I/O request completions, an average service time of the host port 106-1. In an example, the average service time of the host port 106-1 may be computed as a ratio of a busy time period of the host port 106-1 and the number of I/O request completions at the host port 106-1 over the sampling interval. The busy time period of the host port 106-1 refers to a time duration for which the host port 106-1 remains unavailable for processing/receiving I/O requests from the host 102-1. At block 414, the method 400 may include computing a utilization time of the host port 106-1, abbreviated as $T(U)_{HOST\ PORT}$, as a product of the throughput of the host port 106-1 and the average service time of the host port 106-1.

At block 416, the method 400 may include comparing $T(U)_{HOST\ PORT}$ with a host port utilization threshold, abbreviated as $T(U)_{HOST\ PORT}$ THRESHOLD. Further, the method 400 may include checking whether the number of I/O Q-connections at the storage device 104-1 is less than an I/O Q-connection threshold for the storage device 104-1. The I/O Q-connection threshold indicates the maximum number of I/O Q-connections that can be simultaneously supported by the storage device 104-1 for servicing I/O requests. In an example, the I/O Q-connection threshold for the storage device 104-1 may depend on device driver configuration of the storage device 104-1. The information including the I/O Q-connection threshold may be obtained from the device parameter(s) included in a registration command received by the controller 110 from the storage device 104-1.

In response to determining that $T(U)_{HOST\ PORT}$ for the host port 106-2 is almost equal to or greater than the $T(U)_{HOST\ PORT}$ THRESHOLD or that the number of I/O Q-connections at the storage device 104-1 is greater than or equal to the I/O Q-connection threshold for the storage device 104-1, the steps 410 to 416 of the method 400 may be carried out for another host port say host port 106-2.

In response to determining that the $T(U)_{HOST\ PORT}$ for the host port 106-1 is lower than the $T(U)_{HOST\ PORT}$ THRESHOLD and the number of I/O Q-connections at the storage device 104-1 is less than the I/O Q-connection threshold for the storage device 104-1, the method 400 may include creating a candidate list of NVMe storage devices corresponding to the host port 106-1. The candidate list may include NVMe storage devices for which selective adjustment of I/O Q-connections could be considered. At block 418, the method 400 may include, determining a number of I/O request completions at the NVMe storage device 104-1. At block 420, the method 400 may include determining a visit ratio of the NVMe storage device 104-1. The visit ratio of the storage device 104-1 is defined as the number of I/O request completions by the storage device 104-1 per unit time of the sampling interval.

Figure 4B:
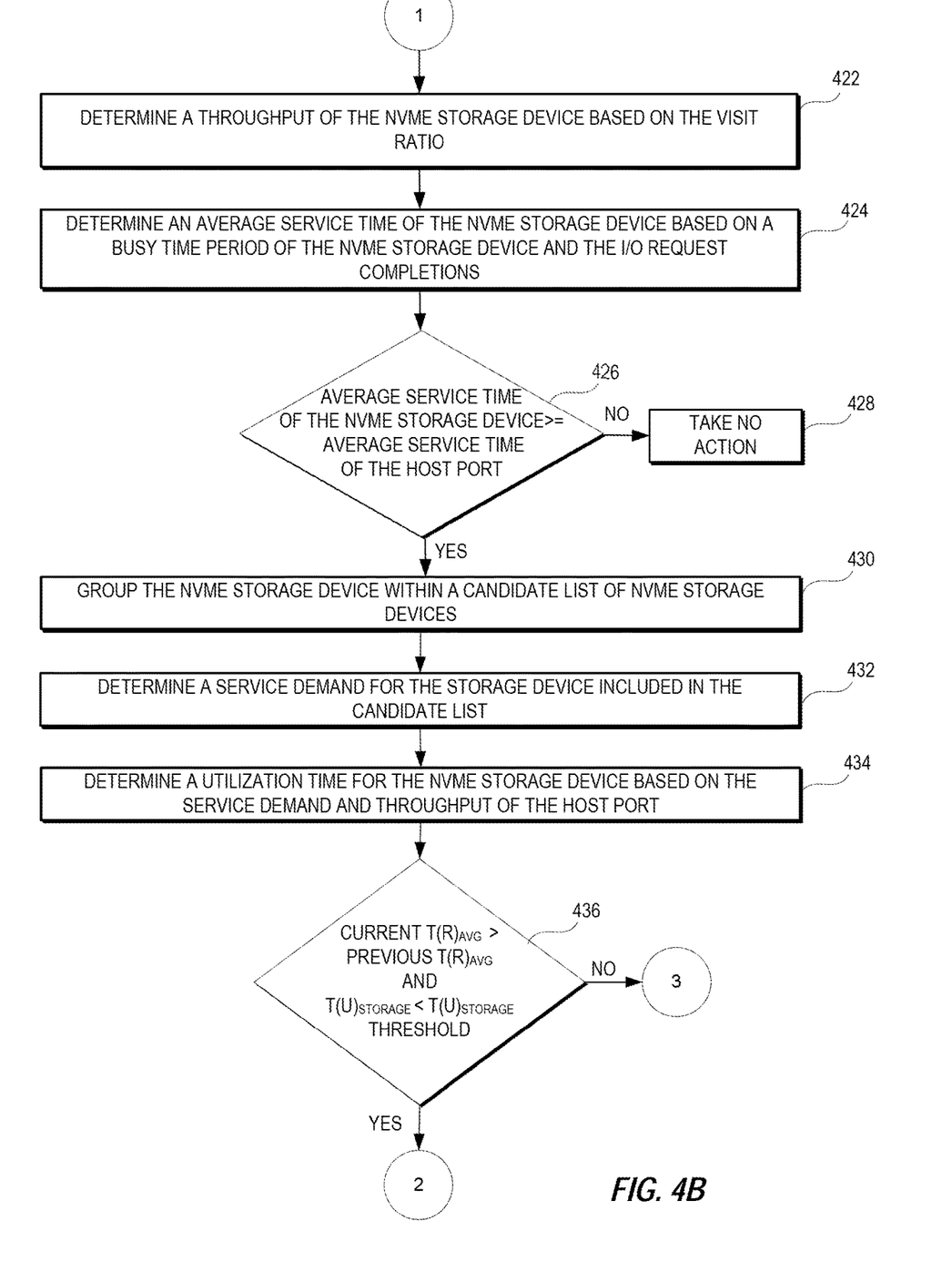

At block 422 of FIG. 4B, the method 400 may include determining a throughput of the NVMe storage device 104-1 based on the visit ratio. In an example, the throughput of the storage device 104-1 may be computed as a product of the visit ratio of the storage device 104-1 and the throughput of the host port 106-1. At block 424, the method 400 may include determining, based on a busy time period of the NVMe storage device 104-1 and the number of I/O request completions, an average service time of the NVMe storage device 104-1. The busy time period of the storage device 104-1 may indicate a time period for which the storage device 104-1 may remain unavailable to process new I/O requests during the sampling interval.

At block 426, the method 400 may include comparing the average service time of the NVMe storage device 104-1 with the average service time of the host port 106-1. In response to determining that the average service time of the NVMe storage device 104-1 is greater than or equal to the average service time of the host port 106-1, at block 430, the method may include grouping the NVMe storage device within the candidate list of NVMe storage devices. In response to determining that the average service time of the NVMe storage device 104-1 is less than the average service time of the host port 106-1, the steps 418 to 426 may be carried for NVMe storage device 104-2 to check whether the NVMe storage device 104-2 is to be grouped within the candidate list. Thus, for each of the NVMe storage devices 104, the steps 418 to 426 may be carried out to check whether the NVMe storage device 104-2 is to be grouped within the candidate list. Consider that the NVMe storage device 104-1 is included in the candidate list.

At block 432, the method 400 may include determining a service demand for the NVMe storage device 104-1. The service demand for the storage device 104-1 may be determined as a product of the visit ratio of the storage device 104-1 and the average service time of the storage device 104-1. At block 434, the method 400 may include determining a utilization time of the NVMe storage device 104-1 ($T(U)_{STORAGE}$) based on the service demand for the storage device 104-1 and throughput of the host port 106-1. $T(U)_{STORAGE}$ may determined as a product of service demand for the storage device 104-1 and throughput of the host port 106-1.

At block 436, the method 400 may include comparing the average time for processing a first set of read requests by the storage device 104-1 during the current sampling interval (Current $T(R)_{AVG}$) with the average time for processing a second set of read requests by the storage device 104-1 in a previous sampling interval (Previous $T(R)_{AVG}$). Further, at block 436, the method 400 may further include checking whether a utilization time of the NVMe storage device 104-1 ($T(U)_{STORAGE}$) is less that a storage utilization threshold ($T(U)_{STORAGE}$ THRESHOLD), say, 95% of the sampling interval.

Figure 4C:
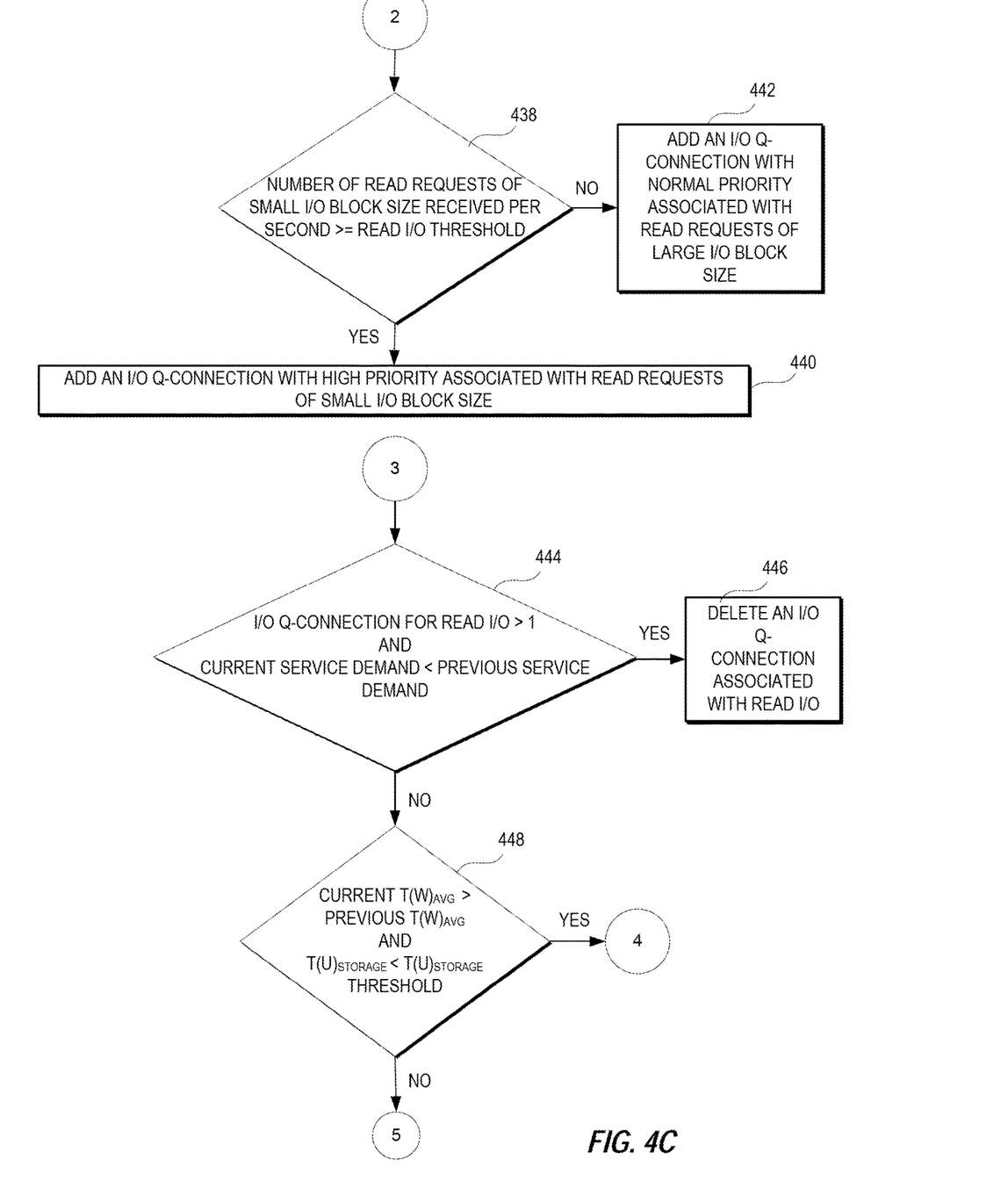

In response to determining that there is an increase in the average time for processing read requests by the storage device 104-1 and the storage device 104-1 has the utilization time ($T(U)_{STORAGE}$) less than the storage utilization threshold ($T(U)_{STORAGE}$ THRESHOLD) (YES' branch from block 436), at block 438 of FIG. 4C, the method 400 may include checking whether a number of read requests of small I/O block size received, at the storage device 104-1, per second during the sampling interval is greater than or equal to a read I/O threshold. The read I/O thresholds may be 80% of the read requests received per second by the storage device 104-1 during the sampling interval.

In response to determining that the number of read requests of small I/O block size received per second during the sampling interval is greater than or equal to the read I/O threshold (YES' branch from block 438), at block 440, the method 400 may include adding an I/O Q-connection with high priority associated with read requests of small I/O block size received at the NVMe storage device 104-1. The I/O Q-connection may include a submission queue and a completion queue between the NVMe controller 110 and the storage device 104-1. The I/O Q-connection is dedicated to read requests having small I/O block sizes. In response to determining that a number of read requests of large I/O block size, such as I/O blocks of 512 KB, received per second during the sampling interval is greater than or equal to the read I/O threshold ('NO' branch from block 438), at block 442, the method 400 may include adding an I/O Q-connection with normal priority associated with read requests of large I/O block size received at the NVMe storage device 104-1. The added I/O Q-connection is dedicated to read requests of large I/O block size received by the storage device 104-1.

In response to determining that there is a decrease in the average time for processing read requests by the storage device 104-1 or the storage device 104-1 has the utilization time ($T(U)_{STORAGE}$) almost equal to or greater than the storage utilization threshold ($T(U)_{STORAGE}$ THRESHOLD) ('NO' branch from block 436), at block 444 of FIG. 4C, the method 400 may include checking whether more than one I/O Q-connection is present between the storage device 104-1 and the NVMe controller 110. Further, at block 444, the I/O Q-connection control instructions 120 may check whether there is a change in the service demand of the storage device 104-1 over two successive sampling intervals. In an example, the service demand of the storage device 104-1 in a first sampling interval may be compared with the service demand of the storage device 104-1 in a second sampling interval to determine the change in service demand. The first and second sampling intervals may be two successive sampling intervals. Responsive to determining that there is a decrease in the service demand of the storage device 104-1 over two successive sampling intervals and more than one I/O Q-connection is present between the storage device 104-1 and the NVMe controller 110 ('YES' branch from block 444), at block 446, the method 400 may include deleting an I/O Q-connection, associated with read I/O, between the storage device 104-1 and the NVMe controller 110.

In response to determining that there is an increase in the service demand of the storage device 104-1 over two successive sampling intervals or a single I/O Q-connection is present between the storage device 104-1 and the NVMe controller 110 ('NO' branch from block 444), at block 448, the method 400 may include comparing the average time for processing a first set of write requests by the storage device 104-1 during the current sampling interval (Current $T(W)_{AVG}$) with the average time for processing a second set of read requests by the storage device 104-1 in a previous sampling interval (Previous $T(W)_{AVG}$). Further, at block 448, the method 400 may further include checking whether a utilization time of the NVMe storage device 104-1 ($T(U)_{STORAGE}$) is less that a storage utilization threshold ($T(U)_{STORAGE}$ THRESHOLD), say, 95% of the sampling interval.

Figure 4D:
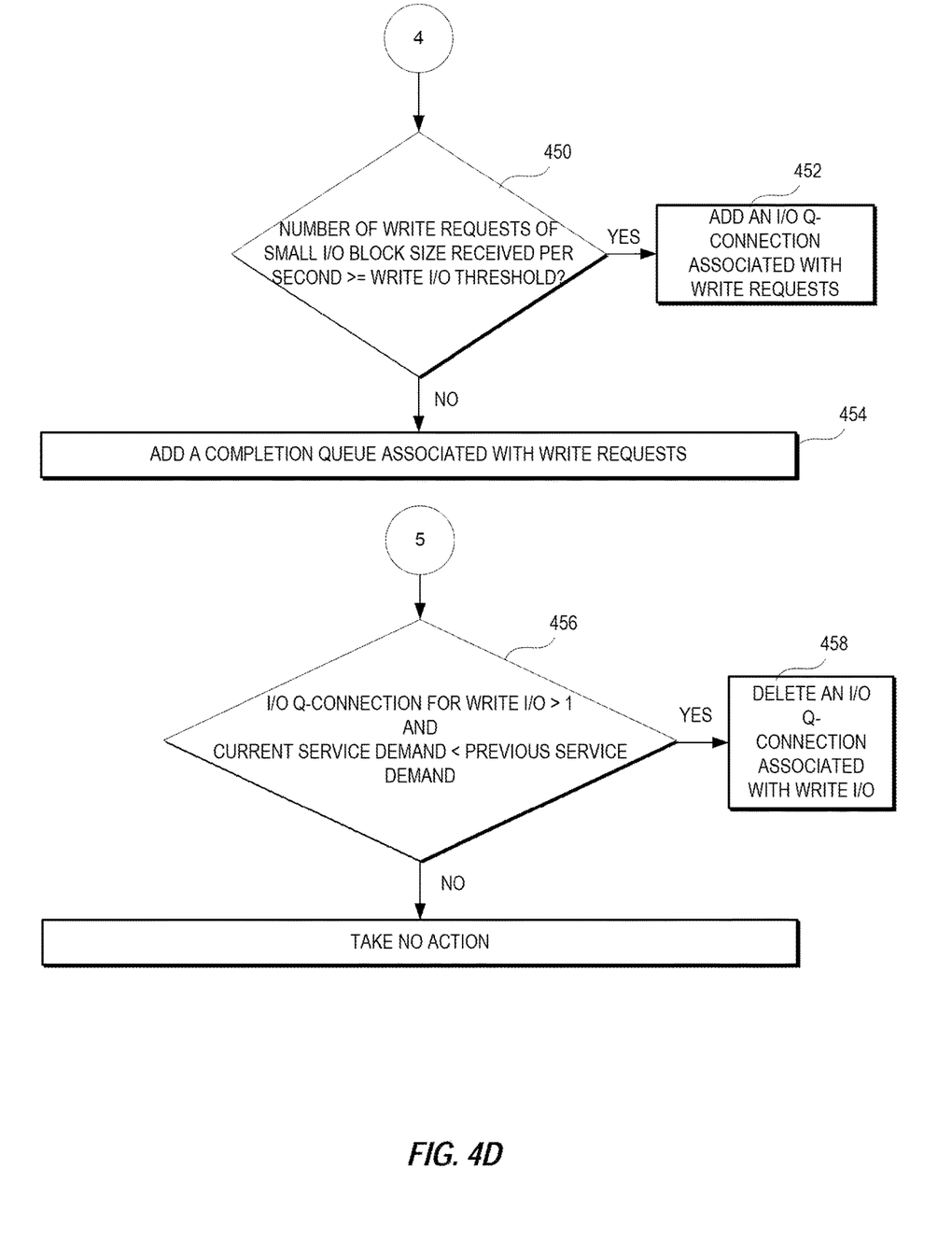

In response to determining that there is an increase in the average time for processing write requests by the storage device 104-1 (i.e., Current $T(w)_{avg}$>previous $T(w)_{avg}$) and the storage device 104-1 has the utilization time ($T(U)_{STORAGE}$) less than the storage utilization threshold ($T(U)_{STORAGE}$ THRESHOLD) (YES' branch from block 448), at block 450 of FIG. 4D, the method 400 may include determining whether a number of write requests of small I/O block size, such as I/O block size less than or equal to 4 KB received per second during the sampling interval is greater than or equal to a write I/O threshold. The write I/O threshold may be 80% of the write requests received per second by the storage device 104-1 during the sampling interval.

In response to determining that the number of write requests of small I/O block size received per second during the sampling interval is greater than or equal to the write I/O threshold (YES' branch from block 450), at block 452, the method 400 may include adding an I/O Q-connection associated with write requests received at the NVMe storage device 104-1. The I/O Q-connection may include a submission queue and a completion queue between the NVMe controller 110 and the storage device 104-1. In response to determining that a number of write requests of large I/O block size, such as I/O blocks of 512 KB, received per second during the sampling interval is greater than or equal to the write I/O threshold ('NO' branch from block 450), at block 454, the method 400 may include adding a completion queue associated with write requests received at the NVMe storage device 104-1.

In response to determining that there is a decrease in the average time for processing write requests by the storage device 104-1 (i.e., Current $T(w)_{avg}$<previous $T(w)_{avg}$) or the storage device 104-1 has the utilization time ($T(U)_{STORAGE}$) almost equal to or greater than the storage utilization threshold ($T(U)_{STORAGE}$ THRESHOLD) (NO' branch from block 448), at block 456 of FIG. 4D, the method 400 may include checking whether more than one I/O Q-connection associated with write I/O is present between the storage device 104-1 and the NVMe controller 110. Further, at block 456, the method 400 may include checking whether there is a change in the service demand of the storage device 104-1 over two successive sampling intervals. In an example, the service demand of the storage device 104-1 in a first sampling interval may be compared with the service demand of the storage device 104-1 in a second sampling interval to determine the change in service demand. The first and second sampling intervals may be two successive sampling intervals. Responsive to determining that there is a decrease in the service demand of the storage device 104-1 over two successive sampling intervals and more than one I/O Q-connection for write requests is present between the storage device 104-1 and the NVMe controller 110 ('YES' branch from block 456), at block 458, the method 400 may include deleting an I/O Q-connection, associated with write I/O, between the storage device 104-1 and the NVMe controller 110.

Examples are described herein with reference to FIGS. 1-4D. It should be noted that the description and figures merely illustrate the principles of the present subject matter along with examples described herein, and should not be construed as limiting the present subject matter. Although some examples may be described herein with reference to a single NVMe storage device, examples may be utilized for several NVMe storage devices. Furthermore, any functionality described herein as performed by a component (e.g., an NVMe controller, an NVMe storage device or a host) of a system may be performed by at least one processing resource of the component executing instructions (stored on a machine-readable storage medium) to perform the functionalities described herein. Various implementations of the present subject matter have been described below by referring to several examples.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as coupled or associated, whether directly without any intervening elements or indirectly with at least one intervening element, unless otherwise indicated. Two elements can be connected mechanically, electrically, or communicatively linked through a communication channel, pathway, network, or system. The term "and/or" as used herein refers to and encompasses any and all possible combinations of the associated listed items. The term "based on" means based at least in part on. It will also be understood that, although the terms first, second, third, etc. may be used herein to describe various elements, these elements should not be limited by these terms, as these terms are only used to distinguish one element from another unless stated otherwise or the context indicates otherwise.

In examples described herein, functionalities described as being performed by "instructions" may be understood as functionalities that may be performed by those instructions when executed by a processing resource. In other examples, functionalities described in relation to instructions may be implemented by any combination of hardware and programming.

As used herein, a "computing device" may be a server, storage device, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated in FIGS. 1 and 4A-4D, NVMe controller 110 may be implemented by one machine-readable storage medium, or multiple machine-readable storage media.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). All of the features disclosed in this specification (including any accompanying claims, abstract and drawings), and/or all of the elements of any method or process so disclosed, may be combined in any combination, except combinations where at least some of such features and/or elements are mutually exclusive.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, systems, and computer program products.

We claim:

1. A method comprising:
   determining a utilization time of a host port in an NVMe controller, wherein the host port is associated with a host and is to communicate with an NVMe storage device;
   in response to determining that the utilization time of the host port is lower than a host port utilization threshold and a number of I/O Q-connections at the NVMe storage device is less than an I/O Q-connection threshold for the NVMe storage device, creating a candidate list of NVMe storage devices, each NVMe storage device included in the candidate list having an average service time greater than or equal to an average service time of a host port associated with the NVMe storage device; and
   for each NVMe storage device included in the candidate list:
      determining processing time and I/O block size of I/O requests at the NVMe storage device; and
      selectively adjusting, based on the processing time and I/O block size of I/O requests, the number of I/O Q-connections at the NVMe storage device.

2. The method of claim 1, wherein determining the utilization time of the host port comprises:
   determining, based on I/O request completions over a sampling interval, a throughput of the host port;
   determining, based on a busy time period of the host port and the I/O request completions, an average service time of the host port; and
   computing the utilization time of the host port as a product of the throughput and the average service time.

3. The method of claim 1, wherein creating the candidate list comprises:
   determining I/O request completions at the NVMe storage device over a sampling interval;
   determining, based on a busy time period of the NVMe storage device and the I/O request completions, the average service time of the NVMe storage device; and
   grouping the NVMe storage device within the candidate list, in response to determining that the average service time of the NVMe storage device is greater than or equal to the average service time of the host port.

4. The method of claim 1, wherein determining the processing time and I/O block size of I/O requests at the NVMe storage device comprises:
   in response to an increase in average time for processing read requests by the NVMe storage device and the NVMe storage device having a utilization time less than a storage utilization threshold:
      determining whether a number of read requests of small I/O block size received per second during a sampling interval is greater than or equal to a read I/O threshold; and
      determining whether a number of read requests of large I/O block size received per second during the sampling interval is greater than or equal to the read I/O threshold.

5. The method of claim 4, wherein selectively adjusting the number of I/O Q-connections comprises:
   in response to determining that the number of read requests of small I/O block size received per second is greater than or equal to the read I/O threshold, adding an I/O Q-connection with high priority associated with read requests of small I/O block size received at the NVMe storage device; and
   in response to determining that the number of read requests of large I/O block size received per second is greater than or equal to the read I/O threshold, adding an I/O Q-connection with normal priority associated with read requests of large I/O block size received at the NVMe storage device.

6. The method of claim 1, wherein determining the processing time and I/O block size of I/O requests at the NVMe storage device comprises:
   determining a service demand for the NVMe storage device based on a visit ratio and the average service time of the NVMe storage device, wherein the visit ratio is the number of I/O request completions at the NVMe storage device per unit time of a sampling interval; and
   determining whether there is a change in the service demand of the NVMe storage device over two successive sampling intervals.

7. The method of claim 6, wherein selectively adjusting the number of I/O Q-connections comprises: in response to a decrease in average time for processing read requests by the NVMe storage device or the NVMe storage device having a utilization time greater than a storage utilization threshold, deleting an I/O Q-connection for read requests based on the change in the service demand of the NVMe storage device.

8. The method of claim 6, wherein selectively adjusting the number of I/O Q-connections comprises:
   in response to a decrease in average time for processing write requests by the NVMe storage device or the NVMe storage device having a utilization time greater than a storage utilization threshold, delete an I/O Q-connection for write requests at the NVMe storage device based on the change in service demand of the NVMe storage device.

9. The method of claim 1, wherein determining the processing time and I/O block size of I/O requests at the NVMe storage device comprises:
   in response to an increase in average time for processing write requests by the NVMe storage device and the NVMe storage device having a utilization time less than a storage utilization threshold:
      determining whether a number of write requests of small I/O block size received per second of a sampling interval is greater than or equal to a write I/O threshold; and
      determining whether a number of write requests of large I/O block size received per second during the sampling interval is greater than or equal to the write I/O threshold.

10. The method of claim 9, wherein selectively adjusting the number of I/O Q-connections comprises:
    in response to determining that the number of write requests of small I/O block size received per second is greater than or equal to the write I/O threshold, adding an I/O Q-connection associated with write requests received at the NVMe storage device; and
    in response to determining that the number of write requests of large I/O block size received per second is greater than or equal to the write I/O threshold, adding a completion queue with normal priority associated with write requests received at the NVMe storage device.

11. A non-volatile memory express (NVMe) controller, comprising:
at least one processing resource and a non-transitory machine-readable storage medium comprising instructions executable by the at least one processing resource to:
determine a utilization time of a host port in an NVMe controller, wherein the host port is associated with a host and is to communicate with an NVMe storage device;
in response to determining that the utilization time of the host port is lower than a host port utilization threshold and a number of I/O Q-connections at the NVMe storage device is less than an I/O Q-connection threshold for the NVMe storage device, create a candidate list of NVMe storage devices, each NVMe storage device included in the candidate list having an average service time greater than or equal to an average service time of a host port associated with the NVMe storage device; and
for each NVMe storage device included in the candidate list:
determine processing time and I/O block size of I/O requests at the NVMe storage device; and
selectively adjust, based on the processing time and I/O block size of I/O requests, the number of I/O Q-connections at the NVMe storage device.

12. The NVMe controller of claim 11, wherein the instructions to determine the utilization time of the host port comprises instructions to:
determine, based on I/O request completions over a sampling interval, a throughput of the host port;
determine, based on a busy time period of the host port and the I/O request completions, an average service time of the host port; and
compute the utilization time of the host port as a product of the throughput and the average service time.

13. The NVMe controller of claim 11, wherein the instructions to create the candidate list comprises instructions to:
determine I/O request completions at the NVMe storage device over a sampling interval;
determine, based on a busy time period of the NVMe storage device and the I/O request completions, the average service time of the NVMe storage device; and
group the NVMe storage device within the candidate list, in response to determining that the average service time of the NVMe storage device is greater than or equal to the average service time of the host port.

14. The NVMe controller of claim 11, wherein the instructions to determine the processing time and I/O block size of I/O requests at the NVMe storage device comprises instructions to:
in response to an increase in average time for processing read requests by the NVMe storage device and the NVMe storage device having a utilization time less than a storage utilization threshold:
determine whether a number of read requests of small I/O block size received per second during a sampling interval is greater than or equal to a read I/O threshold; and
determining whether a number of read requests of large I/O block size received per second during the sampling interval is greater than or equal to the read I/O threshold.

15. The NVMe controller of claim 14, wherein the instructions to selectively adjust the number of I/O Q-connections comprises instructions to:
in response to determining that the number of read requests of small I/O block size received per second during the sampling interval is greater than or equal to the read I/O threshold, add an I/O Q-connection with high priority associated with read requests of small I/O block size received at the NVMe storage device; and
in response to determining that the number of read requests of large I/O block size received per second is greater than or equal to the read I/O threshold, add an I/O Q-connection with normal priority associated with read requests of large I/O block size received at the NVMe storage device.

16. The NVMe controller of claim 11, wherein the instructions to determine the processing time and I/O block size of I/O requests at the NVMe storage device comprises instructions to:
determine a service demand for the NVMe storage device based on a visit ratio and the average service time of the NVMe storage device, wherein the visit ratio is the number of I/O request completions at the NVMe storage device per unit time of a sampling interval; and
determine whether there is a change in the service demand of the NVMe storage device over two successive sampling intervals.

17. The NVMe controller of claim 16, wherein the instructions to selectively adjusting the number of I/O Q-connections comprises instructions to:
in response to a decrease in average time for processing read requests by the NVMe storage device or the NVMe storage device having a utilization time greater than a storage utilization threshold, delete an I/O Q-connection for read requests based on the change in service demand of the NVMe storage device.

18. The NVMe controller of claim 11, wherein the instructions to determine the processing time and I/O block size of I/O requests at the comprises instructions to:
in response to an increase in average time for processing write requests by the NVMe storage device and the NVMe storage device having a utilization time less than a storage utilization threshold;
determine whether a number of write requests of small I/O block size received per second during a sampling interval is greater than or equal to a write I/O threshold; and
determine whether a number of write requests of large I/O block size received per second during the sampling interval is greater than or equal to the write I/O threshold.

19. A non-transitory machine readable medium comprising instructions executable by at least one processing resource to:
determine a utilization time of a host port in an NVMe controller, wherein the host port is associated with a host and is to communicate with an NVMe storage device;
in response to determining that the utilization time of the host port is lower than a host port utilization threshold and a number of I/O Q-connections at the NVMe storage device is less than an I/O Q-connection threshold for the NVMe storage device, create a candidate list of NVMe storage devices, each NVMe storage device included in the candidate list having an average service time greater than or equal to an average service time of a host port associated with the NVMe storage device; and for each NVMe storage device included in the candidate list:
    determine processing time and I/O block size of I/O requests at the NVMe storage device; and
    selectively adjust, based on the processing time and I/O block size of I/O requests, the number of I/O Q-connections at the NVMe storage device.

20. The non-transitory machine readable medium of claim 19, wherein the instructions to determine the utilization time of the host port comprises instructions to:
    determine, based on I/O request completions over a sampling interval, a throughput of the host port;
    determine, based on a busy time period of the host port and the I/O request completions, an average service time of the host port; and
    compute the utilization time of the host port as a product of the throughput and the average service time.

\* \* \* \* \*